Figure 3:
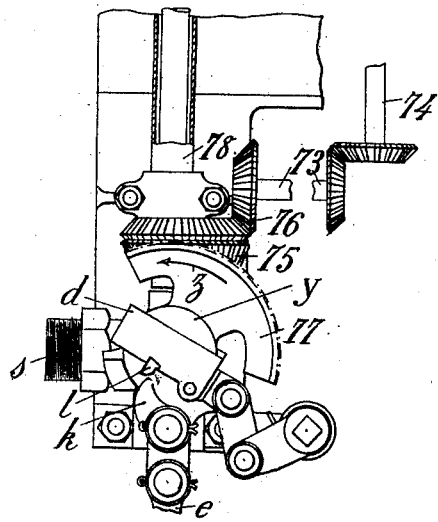

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet I.
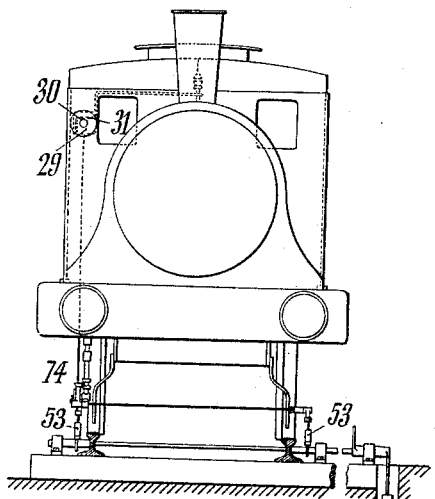
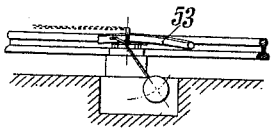
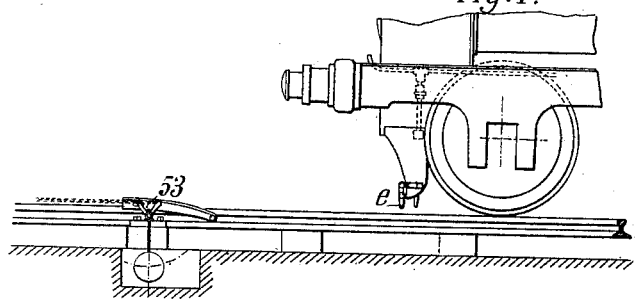
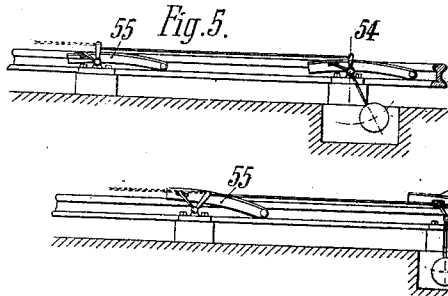
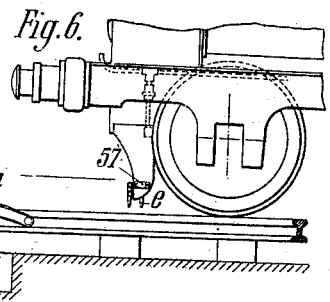

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet 2.

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet 3.
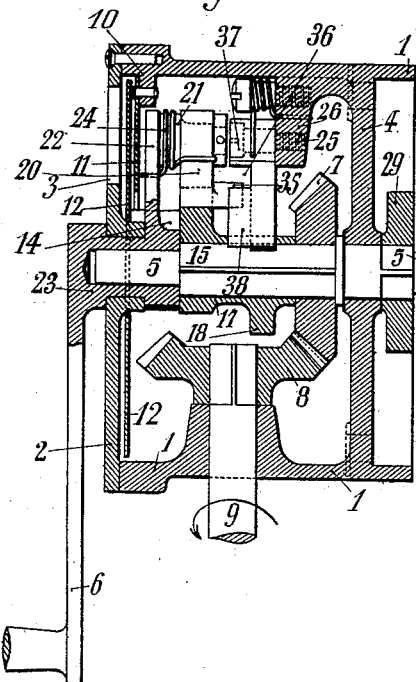
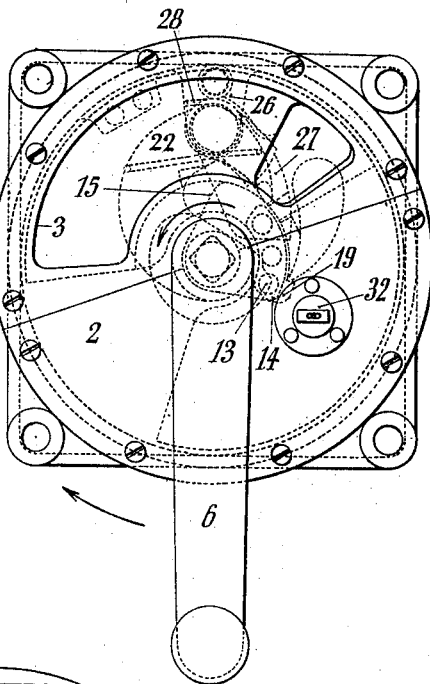
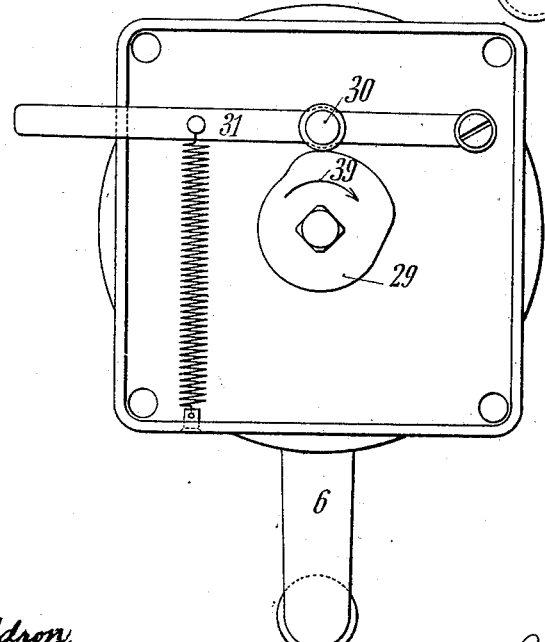
WITNESSES:
Isabella Waldron
INVENTOR.
Jacques Pierre de Braam
BY
Richardson
ATTORNEYS.

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet 4.
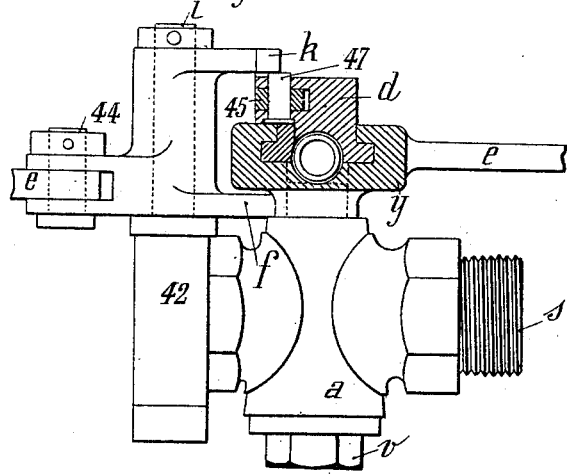
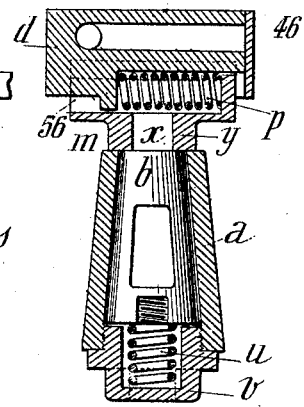
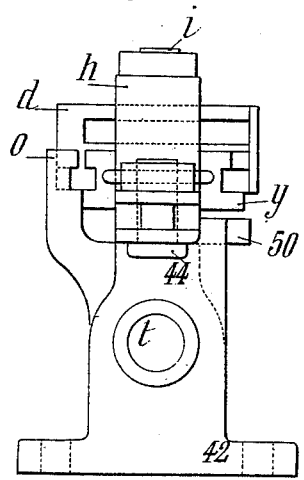
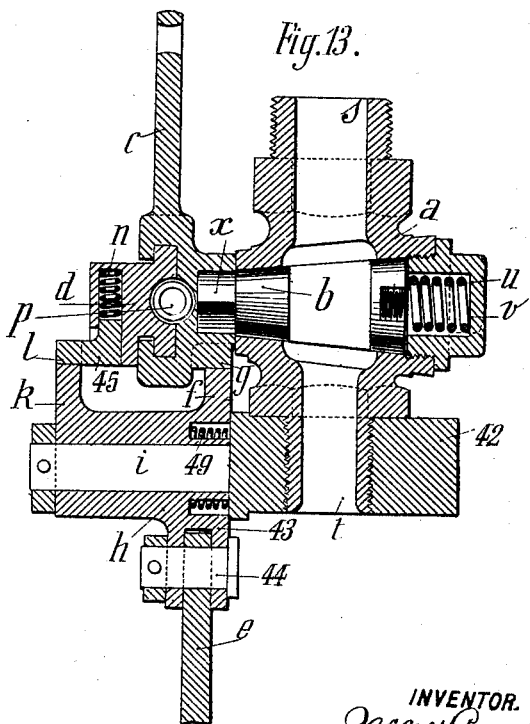

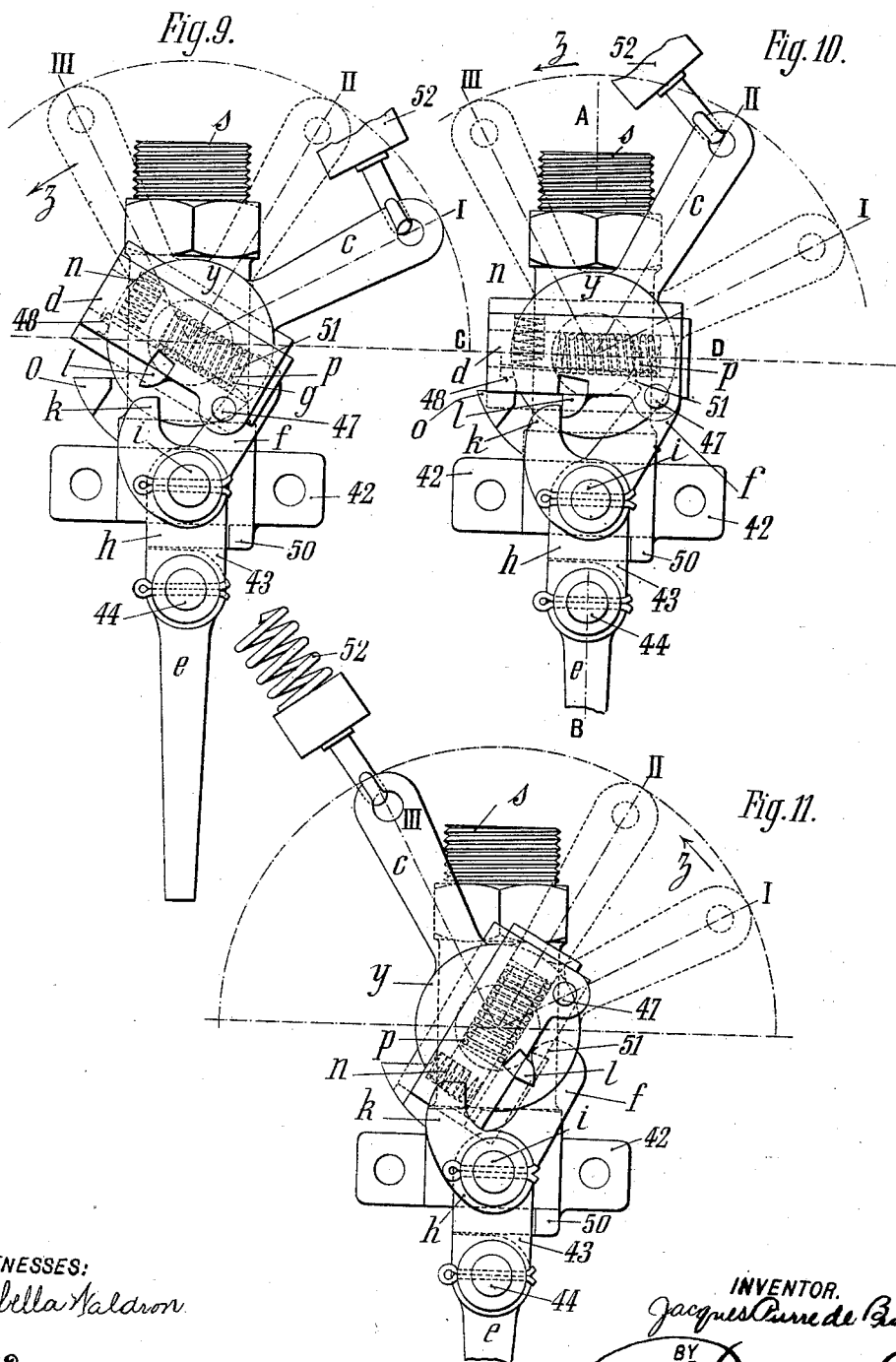

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet 6.
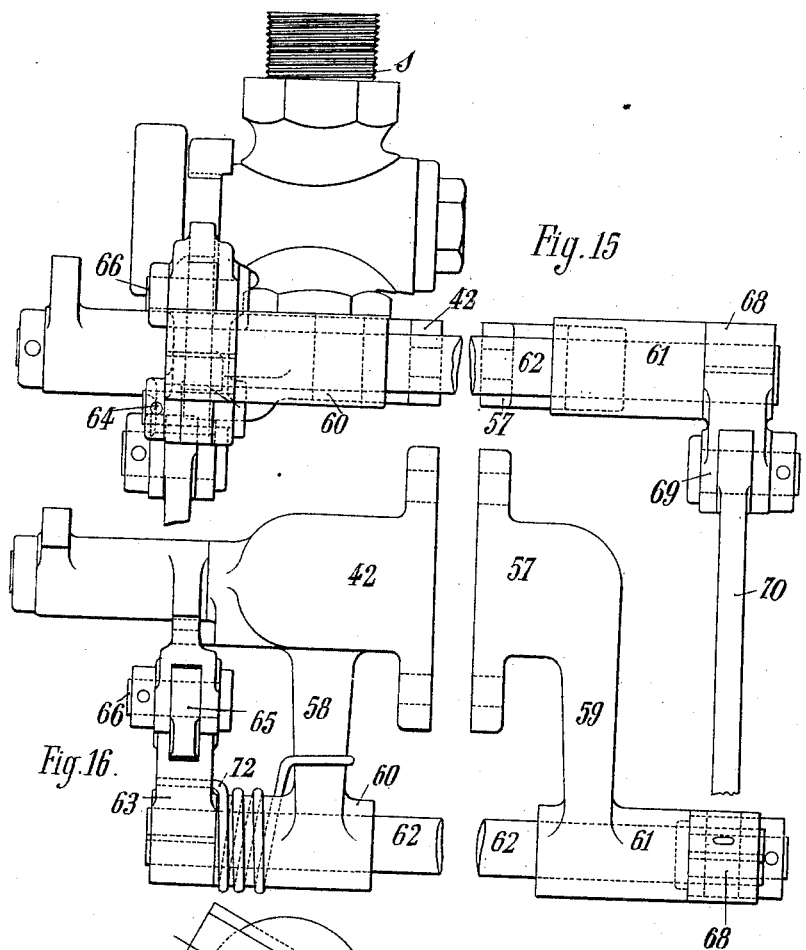
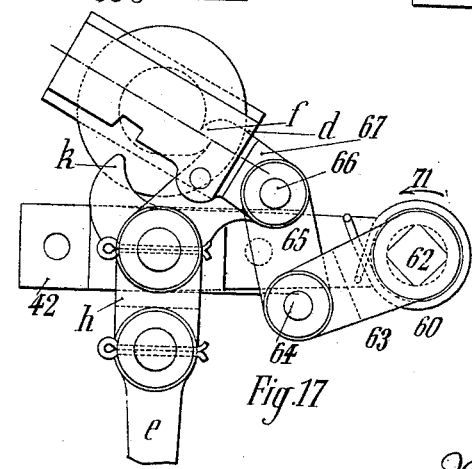
WITNESSES:
Isabella Waldron.
INVENTOR.
Jacques Pierre de Braam
BY
ATTORNEYS.

No. 716,621. Patented Dec. 23, 1902.
J. P. DE BRAAM.
APPARATUS FOR STOPPING TRAINS.
(Application filed June 4, 1901.)
(No Model.) 7 Sheets—Sheet 7.

WITNESSES:

INVENTOR.
Jacques Pierre de Braam
BY
ATTORNEYS.

UNITED STATES PATENT OFFICE.

JACQUES PIERRE DE BRAAM, OF PARIS, FRANCE.

APPARATUS FOR STOPPING TRAINS.

SPECIFICATION forming part of Letters Patent No. 716,621, dated December 23, 1902.

Application filed June 4, 1901. Serial No. 63,095. (No model.)

*To all whom it may concern:*

Be it known that I, JACQUES PIERRE DE BRAAM, of 30 Rue Hamelin, Paris, in the Republic of France, have invented a certain new and useful apparatus for stopping trains at a signal standing at "danger" and at the same time registering the fact that it has been so stopped; and I do hereby declare the following to be a full, clear, and exact description of the invention, such as will enable others skilled in the art to which it appertains to make and use the same.

A number of devices are in existence for operating the pneumatic brakes on a train when the driver has run by a signal standing at "danger" without stopping his train. These arrangements consist of a cock placed on a branch of the automatic brake system, whether it be a vacuum or compressed-air system, this cock being operated automatically and partially or completely opened by a pedal or inclined plane arranged in the permanent way, this pedal or inclined plane being raised or lowered according as the corresponding signal stands at "clear" or at "danger." I have myself designed a special cock for this purpose, which forms the subject of a previous application for a patent and which acts upon the above principles. The exclusive employment of such an apparatus suffers from several inconveniences and drawbacks. In the first place the engine-driver only knows that the cock has come into action by the operation of the brakes, which is the result; but the brakes may be put on by any other cause—such, for example, as the breaking of a coupling or of the connecting-pipe between two carriages or from any other accident that may have occurred to the brake system. In addition, once the mistake of the engine-driver has been repaired by restoring the cock to its original position no evidence of his carelessness remains.

The improvements which I have designed and which form the subject-matter of the present application for a patent relate to an arrangement which while employing a stop-cock connected with the general brake system notifies the engine-driver by means of a signal which is both visual and audible that it has come into operation, while at the same time it registers the fact that he has made a mistake.

The principle of my invention consists in connecting the stop-cock which operates the brake with a mechanism which reproduces on the engine, at a spot where it can be seen by the driver, the movements which have been imparted to the cock by the inclined plane arranged in the permanent way. This mechanism, as I shall point out in detail below, is of such a construction that each time the cock is opened an alarm-whistle is sounded and an indicating-disk appears, showing the driver that he has passed a signal standing at "danger." Finally this mechanism is so arranged that the operation of bringing the cock into the position in which it stops the train has the effect of cutting a piece of lead, whereby the mistake of the driver is registered.

In order that my invention may be the more fully understood, I hereby refer to the accompanying sheets of drawings, which I at the same time make part of this specification.

In the drawings, Figure 1 is a lateral elevation of the whole and represents, on a locomotive, the arrangement of the stop-cock connected with the apparatus for annunciating, indicating, and recording. Fig. 2 is a corresponding front elevation, it being supposed in these two figures that the engine is near a warning-signal or rather near an inclined plane 53 being acted upon by the latter. Fig. 3 is a partial detailed sectional view of a longitudinal elevation, showing particularly the transmission of the movement of the stop-cock to the apparatus for annunciating, indicating, and recording. Fig. 4 is a detail of the inclined plane in position corresponding to the signal standing "clear." Figs. 5 and 6 show how the two consecutive inclined planes 54 and 55 are arranged on the track in the respective normal lowered and raised positions. Fig. 7 is a front elevation showing in dotted lines the interior economy of the cock. Figs. 8 to 14 show the details of the cock. Fig. 8 is a plan. Fig. 9 is a side elevation, the cock being shown in its normal position while the engine is running— that is to say, closed. Fig. 10 is a similar elevation showing the cock slightly open.

Figure 21:
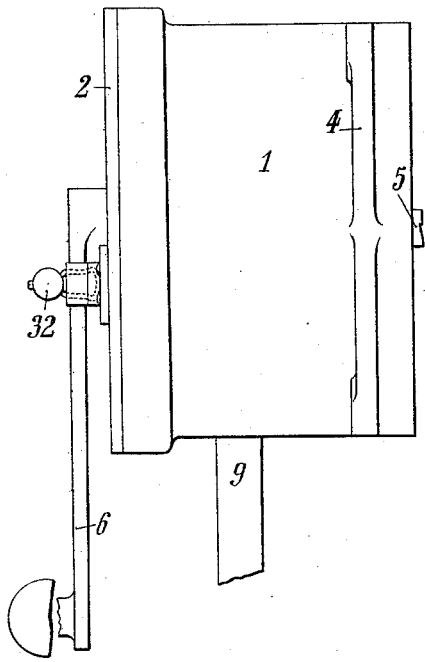
Figure 20:
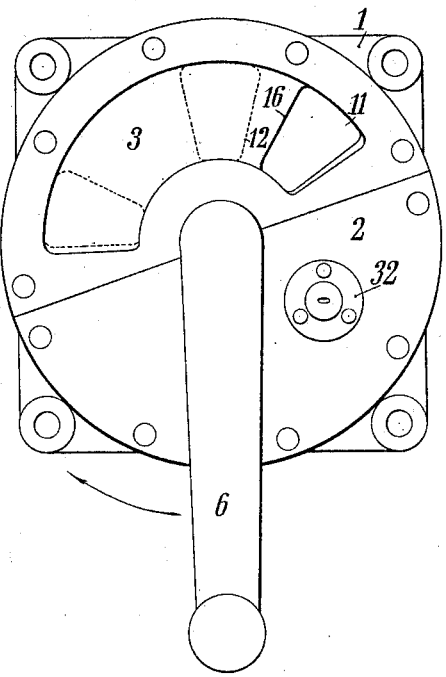
Figure 22:
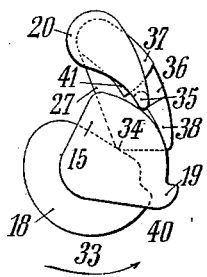
Figure 23:
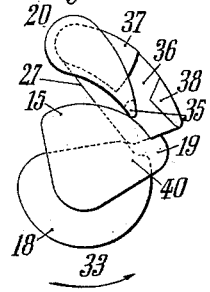
Figure 24:
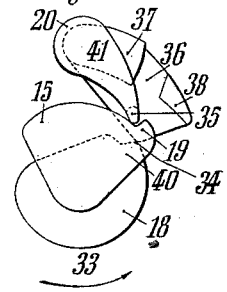

Fig. 11 shows it in its most advanced position. Fig. 12 is a rear side elevation. Fig. 13 is a section along *a b* of Fig. 10. Fig. 14 is a section along the line *c d* of the same figure. Figs. 15, 16, and 17 show, respectively in elevation, plan, and side view, details of the mechanism for enabling the apparatus to operate when the engine is running in either direction. Fig. 18 is a vertical section along the axis of the apparatus. Fig. 19 is a rear elevation. Fig. 20 is a front elevation. Fig. 21 is a side elevation. Figs. 22, 23, and 24 show a side elevation of the cams and kickers in the three positions which correspond to the different positions of the cock.

Each time that the inclined planes are raised—that is to say, when the signal is at "danger"—a lever *e*, belonging to the stop-cock, turns, owing to making contact with the said inclined planes, and operates the stop-cock *a*, so as to establish communication between the brake system in the train and the external atmosphere to such an extent as to produce a slight operation of the brakes. The movement communicated to the cock is transmitted, for example, by means of a rod 73 to a system of levers or of miter-wheels operating the shaft 74, which actuates the indicating and registering apparatus which I shall describe later.

The cock is composed of a plug *a*, communicating on one side by means of the union *s* to the general pneumatic brake system and on the other side of the passage *t* with the atmosphere. The plug is fixed or attached to a support 42, secured to the cow-catcher or plow or any other suitable portion of the locomotive. In the plug is adjusted a key *b*, which according to the position to which it is brought interrupts or establishes partially or completely communication between *s* and *t*. A spring *u*, arranged in the cap *v*, insures that the end of the plug *b* fits tightly in its seat. Lever *c* is fitted upon a square projection *x*, Fig. 13, of the plug and connected by a spring 52 to some convenient part of the engine. The disk *y*, which carries the lever *c*, forms a guide for the cheek *d*. On the axle *i*, cast in one with the support 42, a socket *h* is capable of turning, its lower portion being provided with a cap 43, which serves for supporting a small axle 44, around which is pivoted the lever *e*. The socket *h* is also provided with two pointers, a front pointer *k* and a posterior pointer *f*. The pointer *f* is arranged so as to come in contact with a projection *g* on the disk *y*, while the pointer *k* engages in a similar manner with a projecting arm *l* of a catch 45, Figs. 8 and 13, moving in a recess 46, Fig. 14, of the cheek *d*. The catch is pivoted at one end on the axis 47, carried by the cheek *d*. The spring *n*, Fig. 13, presses regularly with its other end on a lower projection 48, Fig. 10, arranged inside the cheek. The result is that the catch 45 is kept constantly within the cheek and is capable of being raised inside the latter when the end or point of the finger *k* comes into contact with the arm *l*. A spring *p*, arranged in the recess in the disk *y*, Fig. 14, presses with one end on this disk and with its other end on the projection *m* of the cheek. A spring 49, Fig. 13, arranged in the socket *h*, tends to maintain the latter in its vertical position and to press it against the projection 50, Figs. 9, 10, and 11, of the support. The lever *e* carries at its head inside the cap 43 a shoulder which prevents it from turning from right to left beyond its normal vertical position while it is capable of turning from left to right.

Normally the cock is closed and its different parts are in the position I, Fig. 9. The point 51 of the finger *f* is in engagement with the projection *g* of the disk *y*, which prevents the spring 52, acting upon the lever *c*, from causing the latter to turn.

When the lever *e* comes in contact with the first inclined plane 53 when passing the signal, this inclined plane forces the lever against the cap 43, communicating motion to the latter and causing it to operate the socket *h* and the fingers or pointers which it carries. The point 51 of the finger *f* ceases to make contact with the projection *g* and the disk *y* and is turned by the spring 52 in the direction indicated by the arrow *z*. The lever *c* turns till the cheek *d* comes in contact with the surface *o* of the support 42. At the same time the arm *l* of the projection 45 has slipped onto the finger *k* and has raised the spring *n* and is then under the action of this latter brought into engagement with the said finger in the position II, Fig. 10. In this position the cock is slightly open. It will be seen later that the engine-driver can by operating certain mechanism acting upon the lever of the indicator restore the lever *c* to its normal position, Fig. 9.

If, the cock being in position II, the lever *e* comes in contact with the inclined plane 54 corresponding with the signal at its danger position, or if, the cock being brought into position I, the lever *e* passes successively over the two consecutive inclined planes, what happens is as follows: The parts come into the position II, as already pointed out, and the finger or pointer *k* is caused by the lever *e* to act upon the arm *l*, and thereby upon the cheek *d*. This latter fails to make contact with the stop *o*, whereby the spring 52 is permitted to continue to act upon the lever *e*. The cheek *d*, which is displaced in the guide formed by the disk *y*, compresses the spring *p* up to the moment when the said cheek ceases to make contact with the stop *o*. At this moment the spring *p* expands and engages with the cheek behind the said stop *o*, which thereupon slips into the free recesses 56, Fig. 14. Finally the parts come into position III, Fig. 11, the cock being completely opened, so as to cause the rapid operation of the pneumatic brake. In order to bring the lever from the position III to its normal position, the driver is obliged to descend from the locomotive for the purpose of raising the cheek *d* and disengaging it from the stop *o*.

In order that the apparatus may operate equally well whether the locomotive or train is passing in either direction, I have devised the following arrangement—namely, that shown in detail in Figs. 15, 16, and 17. To the two plows or cow-catchers of the locomotive are secured opposite one another the support 42 of the cock and a support 57. Each of these supports is provided with an arm 58 59, carrying a socket 60 61, which two sockets form bearings for a shaft 62. At one of the ends of the shaft—namely, that at which is situated the support 42—is keyed a forked lever 63. In the fork of this lever is pivoted on a pin or axis 46 a connecting-rod 65, the opposite end of which is pivoted about an axle 66, carried by a cheek or bracket 67, forming one casting with the finger or projection *f* of the socket *h* of the main stop-cock. At the opposite end of the shaft 62, in the neighborhood of the spot where the support 61 is situated, is keyed a socket 68, carrying a cap 69, in which a similar lever 70 is mounted, so as to be capable of turning in the opposite direction to that in which the lever *e* of the cock turns. The movement of the lever 70 caused by this latter coming into contact with one of the inclined planes when the engine is running backward causes the shaft 62 to rotate in the direction shown by the arrow 71, Fig. 17, which action, owing to the levers 63 and 65, causes the finger or projection *f* to become disengaged and the cock to be brought from position I into position II.

For the purpose of insuring that the lever *e* is brought back to its normal position, which is only effected by the action of the spring 49, Fig. 13, I arrange around the socket 60 an auxiliary spring 72, one portion of which rests on the fixed support 58 and the other on the forked lever 63.

The apparatus for indicating to the driver that a signal has been passed is shown in detail in Fig. 7 and in Figs. 18 to 24. The apparatus is composed of a box or case 1, closed in front by a disk 2, attached to it, in which an aperture or recess 3 is arranged, Figs. 17, 18, and 20. The disk 2 and the bottom 4 of the box support a shaft or horizontal axis 5, carrying externally to the apparatus a hand-lever 6. On this same axle is keyed a miter-wheel 7, which is operated from the shaft 9 by another miter-wheel 8, thereby transmitting the movements from the cock when automatically actuated. Opposite the disk 2 and attached to the interior of the box on a ridge 10 is a half-disk 11, carrying three inscriptions—namely, "Line clear," "Advance," and "Line blocked," corresponding to the positions I, II, and III of the stop-cock. Between the disk 11 and the cover 3 the half-disk 12 is capable of moving, being fixed by rivets 13 to a sector 14, carried by a cam 15. In the said disk 12 is an aperture 16, which, according to the position taken up by the shaft 5, this shaft being connected with and operated by the cock, takes up successively positions opposite one of the three inscriptions on the fixed disk 11. A sleeve 17, keyed on the shaft 5, carries two cams 15 and 18 integral with it, the profile of these cams being shown in detail in Figs. 22, 23, and 24. The cam 15 carries a projection 19, arranged in such a manner as to engage with the pawl 20, pivoted on the axle 21, Fig. 18, which is normally in the position projecting from the arm 22, carried by the socket 23 of the lever 6. A spring 24 tends constantly to raise the end of the pawl 20 on the cam 15. A kicker 27, attached to a ridge 26 on the box, is pivoted on the shaft 25. A spring 28 keeps this kicker in contact with the cam 18. On the shaft 5, externally to the box and on the rear face, is further keyed another cam 29, Figs. 18 and 19, designed to actuate a tongue 30, carried by a lever, which operates one of the steam-whistles of the locomotive, Fig. 19.

On the disk 2, to the right of the lever 5, is fixed a counterpoise or controlling weight 32, the function of which will be described later.

When the locomotive is running forward in the ordinary way, when the stop-cock is in position I the shaft 5 is in repose. The lever 6 being free of this shaft is in the vertical position shown in the figures, and the cams 15 and 18 occupy the position relatively to the kickers 20 and 27 shown in Fig. 22. When, owing to the action of the inclined plane 55 of the lever *e* of the cock, this latter is set in motion and passes from the position I to the position II, the shaft 9 being controlled by the stop-cock communicates movement to the shaft 5. The cams 15 and 18 turn in the direction shown by the arrow 33. The kicker 27, the end of which glides on the cam 18, is raised by this latter.

Normally in repose the pawl 20 is in engagement with the projection 35, working in a path 36, formed between two projections 37 and 38 of the kicker 27; but as soon as the contact 34 is raised by the cam 18 the projection 35 is disengaged and brought out of the path 36, and the pawl 20 is enabled to glide over the cam 15 and to become displaced toward the right. Every time the movement of the cock leaves this pawl at rest and the cam 15 becomes displaced, together with the cam 18, they take up the position shown in Fig. 23. The cam 15 has brought the movable disk 12 into such a position that the window discloses the inscription "Advance," whereas the normal position of that window is such as to disclose the inscription "Line free." When a slight application of the brake occurs, the driver finds himself informed of the fact by a visual signal. At the same time the cam 29, which is displaced in the direction of the arrow 39, causes the whistle to operate. If the driver perceives, as he ought to do, from these two signals, both visual and audible, that this application of the brake has taken place, he can on taking the necessary precautions restore the different parts of the apparatus to their normal position and place the cock in position I. For this purpose he moves the lever 6 from right to left. The arm 22 then draws the pawl 32 from left to right. The end or nose of the pawl 35 strikes against the projection 16 of the cam 15 and brings the two cams 15 and 18 into their normal position, Fig. 22. The contact or tappet 34 being raised by the cam 18, the point 36 is locked in the groove or passage 36, the lever 31 is raised by the cam 29, the whistle stops working, and the aperture 16 in the movable disk 12 is brought opposite the inscription "Line free." If now, owing to his not observing the rules, the engine-driver passes the "signal-block," the two consecutive inclined planes 54 and 55, coming in contact with the lever e of the cock, bring the latter into position III. The same effect is produced by contact with the first inclined plane 54 if the cock has been left in position II instead of having been brought back by the lever 6 to its normal position. In consequence the parts of the indicating apparatus are first brought into the position II, Fig. 23, and continue their movement further.

The projection 40 of the cam 18 raises the contact 34 of the kicker 27, which latter is raised and permits the finger of the pawl 35, which up till that moment was only capable of a movement from right to left, to be displaced in this direction by the projection 19 of the cam 15, which comes into contact with it. The pawl 20 being displaced from right to left, the arm 22 of the socket 23 is drawn in the same direction, this giving rise to an equivalent displacement of the lever 6 in the opposite direction. Owing to this fact, the controlling-lead 32 is guillotined or cut in two, which shows in a very clear manner the fault committed by the driver. The cutting off of the lead can by no means take place by chance or by a false movement of the lever 6. As a matter of fact, when the stop-cock has not passed position II it is not possible for the driver to displace the lever 6 from left to right beyond its normal position, provided the projection of finger 35 abuts against the lower angle of the projection 37 of the kicker 27. (See Fig. 22.) When the driver has cut in two the control lead, he cannot any longer move the lever 6 from right to left into its normal position before he has got down from the locomotive, and thus engage the stop-cock in the manner I have already explained.

It will be understood that it is only by way of example that I have given the particular form of carrying out my invention above described as regards the registering and indicating portion of the apparatus, the details being variable without departing from or altering the general nature of my invention.

I claim—

1. An apparatus for stopping trains in the neighborhood of signals standing at danger, consisting of the combination of a stop-cock acting on the pneumatic brake with a mechanism to which all the movements of this cock are transmitted so that it operates at each movement of the said cock, a whistle and a disk indicating to the driver that he has passed the signal by inadvertence.

2. In apparatus for automatically stopping trains in the neighborhood of signals standing at danger, an indicating and registering apparatus in which a transmission discloses to the view of the driver one of three inscriptions "Line clear," "Advance," "Line blocked," according as the stop-cock attached to the plows or cow-catchers is partly or fully opened.

3. In apparatus for automatically stopping trains in the neighborhood of signals standing at danger, an indicating and registering apparatus in which a hand-lever enables the driver to restore the stop-cock from the position corresponding to "Advance" to the position corresponding to "Line clear"; this lever automatically cutting the controlled lead when the stop-cock is brought into the position which corresponds to "Line blocked" together with a locking device preventing the driver from himself cutting the controlled lead which can only be cut through by the automatic operation of the stop-cock when a signal standing at "block" is passed.

In witness whereof I have hereunto set my hand in presence of two witnesses.

JACQUES PIERRE DE BRAAM.

Witnesses:
 LOUIS GARDET,
 EDWARD P. MACLEAN.